(12) United States Patent
Jung

(10) Patent No.: US 11,750,573 B2
(45) Date of Patent: Sep. 5, 2023

(54) SYSTEM FOR TRANSMITTING AND RECEIVING DATA BASED ON VEHICLE NETWORK AND METHOD THEREFOR

(71) Applicants: Hyundai Motor Company, Seoul (KR); Kia Motors Corporation, Seoul (KR)

(72) Inventor: Ho Jin Jung, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 312 days.

(21) Appl. No.: 17/087,030

(22) Filed: Nov. 2, 2020

(65) Prior Publication Data

US 2021/0409383 A1 Dec. 30, 2021

(30) Foreign Application Priority Data

Jun. 26, 2020 (KR) ........................ 10-2020-0078291

(51) Int. Cl.
*H04L 9/08* (2006.01)
*H04L 9/40* (2022.01)

(52) U.S. Cl.
CPC ........ *H04L 63/0428* (2013.01); *H04L 9/0869* (2013.01); *H04L 63/061* (2013.01)

(58) Field of Classification Search
CPC ... H04L 9/0897; H04L 9/0869; H04L 63/061; H04L 63/0428; H04L 2209/84; H04L 29/06; H04L 9/08
USPC ........................................................ 713/168
See application file for complete search history.

(56) References Cited

U.S. PATENT DOCUMENTS

| | | | | |
|---|---|---|---|---|
| 9,397,829 B2* | 7/2016 | Iwashita | ............... | H04L 9/0897 |
| 9,525,670 B2* | 12/2016 | Maruyama | .......... | H04L 63/0435 |
| 2013/0332736 A1* | 12/2013 | Kawamura | ............. | B60R 25/24 |
| | | | | 713/171 |
| 2014/0301550 A1* | 10/2014 | Lewis | ................... | H04L 9/0822 |
| | | | | 380/259 |
| 2014/0310530 A1* | 10/2014 | Oguma | ..................... | H04L 9/32 |
| | | | | 713/181 |
| 2014/0317729 A1* | 10/2014 | Naitou | ................ | H04L 63/0471 |
| | | | | 726/21 |
| 2014/0355761 A1* | 12/2014 | Kawamura | ......... | H04W 12/068 |
| | | | | 380/270 |
| 2015/0003613 A1* | 1/2015 | Kawamura | ............. | B60R 25/24 |
| | | | | 380/278 |
| 2015/0113280 A1* | 4/2015 | Maruyama | ............ | H04L 63/061 |
| | | | | 713/171 |
| 2015/0263860 A1* | 9/2015 | Leboeuf | ................ | H04L 9/3226 |
| | | | | 713/171 |
| 2016/0099806 A1* | 4/2016 | Racklyeft | ............. | H04W 12/08 |
| | | | | 380/281 |

(Continued)

*Primary Examiner* — Amare F Tabor
(74) *Attorney, Agent, or Firm* — Fox Rothschild LLP

(57) ABSTRACT

A system for transmitting and receiving data based on a vehicle network and a method therefor are provided. The method includes generating, by a first hardware security module (HSM), a first session key using a first random number and a first fixed key and, encrypting, by a first electric control unit (ECU), a message using the first session. The method also includes generating, by a second HSM, a second session key using a second random number and a second fixed key, and decrypting, by a second ECU, the message using the second session key.

11 Claims, 5 Drawing Sheets

(56) References Cited

U.S. PATENT DOCUMENTS

2016/0173505 A1* 6/2016 Ichihara .............. H04W 12/121
 713/170
2016/0173530 A1* 6/2016 Miyake .................. H04L 63/20
 726/3

* cited by examiner

SYSTEM FOR TRANSMITTING AND RECEIVING DATA BASED ON VEHICLE NETWORK AND METHOD THEREFOR

CROSS-REFERENCE TO RELATED APPLICATION

This application claims the benefit of priority to Korean Patent Application No. 10-2020-0078291, filed on Jun. 26, 2020, the entire contents of which are incorporated herein by reference.

TECHNICAL FIELD

The present disclosure relates to technologies for allowing each electric control unit (ECU) connected to a vehicle network to safely transmit and receive data.

BACKGROUND

In general, the vehicle network may include a controller area network (CAN), a local interconnect network (LIN), FlexRay, media oriented systems transport (MOST), an Ethernet, or the like. Recently, as it is impossible to transmit and receive data in real time over the CAN due to an increase in data traffic in the vehicle, a controller area network with flexible data rate (CAN FD) which is a new CAN protocol has been developed.

To resolve a bottleneck phenomenon according to an increase in traffic, such a CAN FD is expanded from 8 Bytes to 64 Bytes in data length in a CAN FD communication frame and is permitted to a maximum of 15 Mbit/s in data transfer rate. Thus, communication protocols of various controllers in the vehicle have changed to a CAN protocol and a technology of ensuring confidentiality and integrity of the CAN message due to expansion of a payload in the CAN message has been developed.

Furthermore, a technology that ensures confidentiality in any communication interval through encryption for firmware itself as well as integrity of the firmware when updating the firmware of the controller has been developed. Although such technologies use a mechanism with high security or a 'crypto' algorithm, since security is compromised when the decryption key is leaked, it is more important to manage the decryption key than anything else. Since a conventional method for transmitting and receiving data based on a vehicle network uses a session key generated therein without a hardware security module (HSM) in the process of encrypting CAN data at a transmit end and decrypting the CAN data at a receive end, confidentiality is not ensured when the session key is leaked.

Details described in the background art are written to increase the understanding of the background of the present disclosure, which may include details rather than an existing technology well known to those skilled in the art.

SUMMARY

The present disclosure provides a system for transmitting and receiving data based on a vehicle network, which is capable of allowing a transmit end to encrypt data using a session key generated by a hardware security module 1 (HSM1) end and transmit the encrypted data over the vehicle network and allowing a receive end to decrypt the data (the encrypted data) using the session key generated by an HSM2 to safely transmit and receive data although the session key is leaked, and a method therefor.

The technical problems to be solved by the present inventive concept are not limited to the aforementioned problems, and any other technical problems not mentioned herein will be clearly understood from the following description by those skilled in the art to which the present disclosure pertains. Furthermore, it may be easily seen that purposes and advantages of the present disclosure may be implemented by means indicated in claims and a combination thereof.

According to an aspect of the present disclosure, a method for transmitting and receiving data based on a vehicle network may include generating, by a first hardware security module (HSM), a first session key using a first random number and a first fixed key, encrypting, by a first electric control unit (ECU), a message using the first session, generating, by a second HSM, a second session key using a second random number and a second fixed key, and decrypting, by a second ECU, the message using the second session key.

An exemplary embodiment of the present disclosure may include generating, by the first ECU, the first random number and delivering, by the first ECU, the first random number to the first HSM. Additionally, an exemplary embodiment of the present disclosure may include encrypting data recorded in a payload of the message and transmitting the encrypted message over the vehicle network.

The method may further include generating, by the second ECU, the second random number which is the same as the first random number, delivering, by the second ECU, the second random number to the second HSM, and generating, by the second HSM, the second session key using the second fixed key which is the same as the first fixed key and the second random number. The message may be a controller area network (CAN) message.

According to another aspect of the present disclosure, a method for transmitting and receiving data based on a vehicle network may include transmitting, by a portable diagnostic device, metadata and encrypted firmware to the vehicle network, generating, a hardware security module (HSM), a session key using a fixed key and the metadata, and decrypting, by an electric control unit (ECU), the firmware using the session key.

In another exemplary embodiment of the present disclosure, the metadata may include a random number and version information of the firmware. Another exemplar)/ embodiment of the present disclosure may include generating a session key capable of decrypting firmware of a current version based on the version information of the firmware. The may further include recording, by the ECU, the decrypted firmware in a flash memory for each block and updating, by the ECU, the firmware. In addition, the method may include deleting, by the ECU, data recorded in the flash memory, when the update of the firmware is completed.

According to another aspect of the present disclosure, a system for transmitting and receiving data based on a vehicle network may include a first hardware security module (HSM) configured to generate a first session key using a first random number and a first fixed key, a first electric control unit (ECU) configured to encrypt a message using the first session key, a second HSM configured to generate a second session key using a second random number and a second fixed key, and a second ECU configured to decrypt the message using the second session key.

In an exemplary embodiment of the present disclosure, the first ECU may be configured to generate the first random number and deliver the generated first random number to the first HSM. The first ECU may be configured to encrypt data recorded in a payload of the message and transmit the encrypted message over the vehicle network. In addition, the second ECU may be configured to generate the second random which is the same as the first random number and deliver the generated second random number to the second HSM. In addition, the second HSM may be configured to generate the second session key using the second fixed key which is the same as the first fixed key and the second random number.

According to another aspect of the present disclosure, a system for transmitting and receiving data based on a vehicle network may include a portable diagnostic device configured to transmit metadata and encrypted firmware to the vehicle network, a hardware security module (HSM) configured to generate a session key using a fixed key and the metadata, and an electric control unit (ECU) configured to decrypt the firmware using the session key.

In another exemplary embodiment of the present disclosure, the metadata may include a random number and version information of the firmware. In another exemplary embodiment of the present disclosure, the HSM may be configured to generate a session key capable of decrypting firmware of a current version based on the version information of the firmware.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
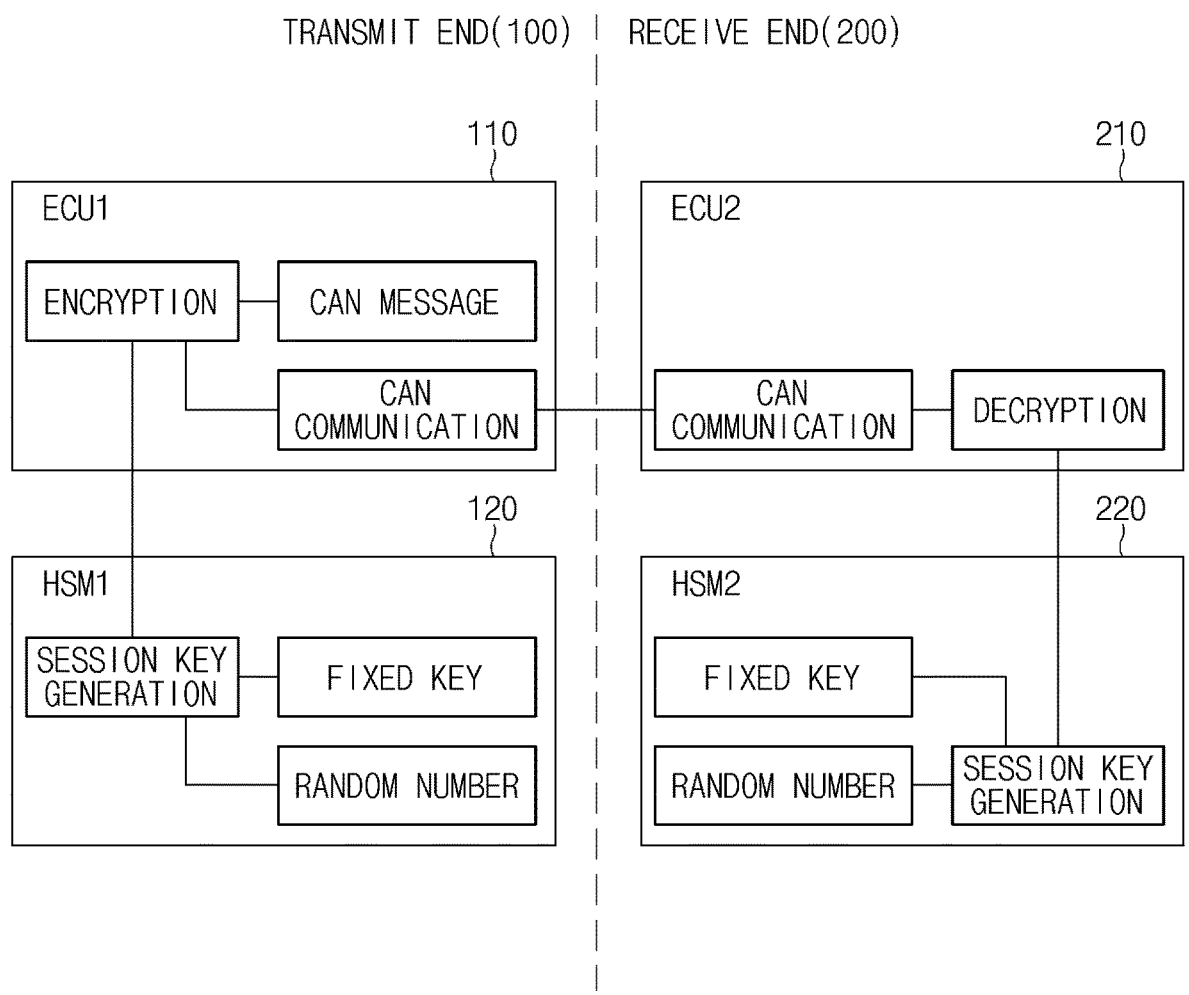
FIG. 1 is a drawing illustrating a configuration of a system for transmitting and receiving data based on a vehicle network according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, some exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the exemplary embodiment of the present disclosure, a detailed description of well-known features or functions will be ruled out in order not to unnecessarily obscure the gist of the present disclosure.

In describing the components of the exemplary embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a drawing illustrating a configuration of a system for transmitting and receiving data based on a vehicle network according to an exemplary embodiment of the present disclosure. A controller area network (CAN) message will be described as being an example of data. As shown in FIG. 1, the system for transmitting and receiving the data based on the vehicle network according to an exemplary embodiment of the present disclosure may include an electric control unit 1 (ECU1) 110 and a hardware security module 1 (HSM1) 120, which are located at a transmission end 100, and an ECU2 210 and an HSM2 220, which are located at a receiving end 200. In particular, the respective components may be combined into one component and some components may be omitted, depending on a manner which executes the system for transmitting and receiving the data based on the vehicle network according to an exemplary embodiment of the present disclosure.

The transmission end 100 may refer to a part or device which is connected to a CAN and configured to transmit a CAN message. The receiving end 200 may refer to a part or device which is connected to the CAN and configured to receive the CAN message. The ECU1 110 which wants to transmit a CAN message may be configured to generate a random number and deliver the generated random number to the HSM1 120 to request the HSM1 120 to generate a session key. The ECU1 110 may be configured to encrypt a CAN message using a session key delivered from the HSM1 120. In particular, the ECU1 110 may have a memory (not shown) configured to store a cryptographic algorithm such as the advanced encryption standard (AES) or the Rivest Shamir Adleman (RSA).

Herein, the memory may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk. The ECU1 110 may be configured to encrypt data stored in a payload of the CAN message. The ECU1 110 may be configured to transmit the encrypted CAN message to the receiving end 200 via CAN communication. In particular, the ECU1 110 may be configured to broadcast the encrypted CAN message to the CAN.

The HSM1 120 may be configured to generate a session key using a fixed key stored therein and the random number delivered from the ECU1 110. Since the fixed key is not directly delivered to the ECU1 110, there is no possibility that the fixed key will be leaked. The HSM1 120 may have a 'crypto' module used to generate the session key. Such a 'crypto' module may have a cryptographic algorithm such as the advanced encryption standard (AES) or the Rivest Shamir Adleman (RSA).

The ECU2 210 may be configured to receive the encrypted CAN message from the ECU1 110 via CAN communication. The ECU2 210 may be configured to generate a random number and deliver the generated random number to the HSM2 220. In particular, the random number may be the same as the random number used for the HSM1 120 to generate the session key. The ECU2 210 may be configured to decrypt the CAN message using the session key delivered from the HSM2 220. The HSM2 220 may be configured to generate a session key using a fixed key stored therein, which is the same as the fixed key stored in the HSM1 120, and the random number delivered from the ECU2 210. In particular, the HSM2 220 may have a 'crypto' module used to generate the session key. For reference, each of the HSM1 120 and the HSM2 220 may be a type of a security token, which may include a processor and a memory therein to generate a session key using a random number and a fixed key.

Figure 2:
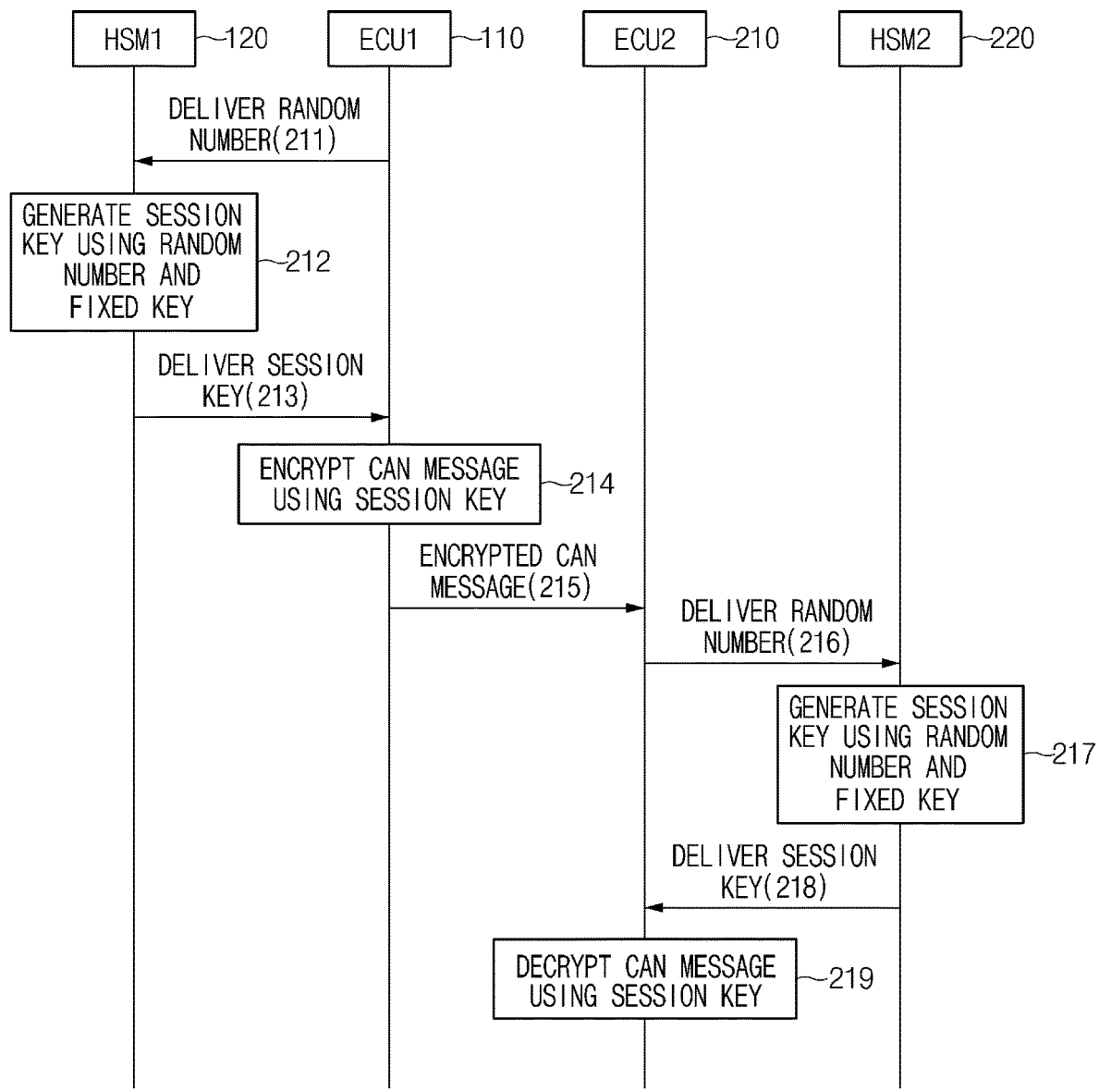
FIG. 2 is a signal sequence diagram illustrating a method for transmitting and receiving data based on a vehicle network according to an exemplary embodiment of the present disclosure.

FIG. 2 is a signal sequence diagram illustrating a method for transmitting and receiving data based on a vehicle network according to an exemplary embodiment of the present disclosure. A CAN message will be described as being an example of data. First of all, in operation 211, an ECU1 110 which wants to transmit a CAN message may be configured to generate a random number and deliver the generated random number to an HSM1 120. In other words, the ECU1 110 may be configured to request the HSM1 120 to generate a session key.

In operation 212, the HSM1 120 may be configured to generate a session key using a fixed key stored therein and the random number delivered from the ECU1 110. In operation 213, the HSM1 120 may be configured to deliver the generated session key to the ECU1 110. In operation 214, the ECU1 110 may be configured to encrypt a CAN message using the session key delivered from the HSM1 120. In operation 215, the ECU1 110 may be configured to transmit the encrypted CAN message to an ECU2 210 via a CAN. In particular, the ECU1 110 may be configured to broadcast the encrypted CAN message to the CAN.

In response to receiving the encrypted CAN message, in operation 216, the ECU2 210 may be configured to generate a random number and deliver the generated random number to an HSM2 220. In other words, the ECU2 210 may be configured to request the HSM2 220 to generate a session key. In operation 217, the HSM2 220 may be configured to generate a session key using a fixed key stored therein and the random number delivered from the ECU2 210. In operation 218, the HSM2 220 may be configured to deliver the generated session key to the ECU2 210. In operation 219, the ECU2 210 may be configured to decrypt the CAN message using the session key delivered from the HSM2 220.

The method for transmitting and receiving data based on a vehicle network according to an exemplary embodiment of the present disclosure may allow the HSM1 120 and the HSM2 220 to generate the session key capable of being used in only the current session using the random number and the unique key possessed therein, thus preventing the unique key from being directly delivered to the ECU1 110 and the ECU2 210 to prevent the unique key from being leaked to the outside. Furthermore, the method for transmitting and receiving the data based on the vehicle network according to an exemplary embodiment of the present disclosure may allow the ECU1 110 and the ECU2 210 to perform the encryption/decryption process of the CAN message, thus minimizing the number of times of calling or accessing an HSM application program interface (API) to facilitate real-time transmission and reception of the CAN message.

Figure 3:
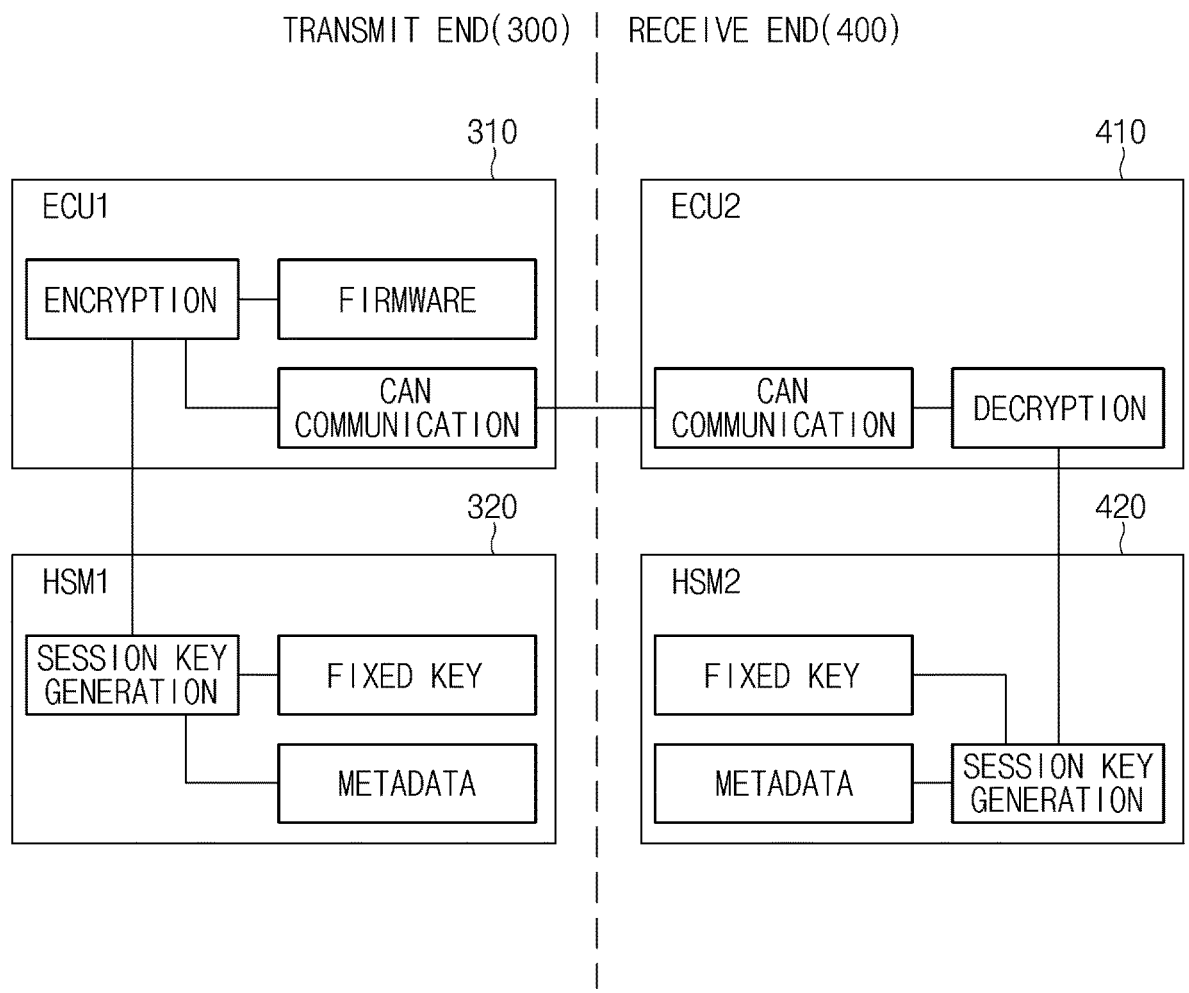
FIG. 3 is a drawing illustrating a configuration of a system for transmitting and receiving data based on a vehicle network according to another exemplary embodiment of the present disclosure.

FIG. 3 is a drawing illustrating a configuration of a system for transmitting and receiving data based on a vehicle network according to another exemplary embodiment of the present disclosure. Firmware will be described as being an example of data. As shown in FIG. 3, the system for transmitting and receiving the data based on the vehicle network according to another exemplary embodiment of the present disclosure may include an ECU1 310 and an HSM1 320, which are located at a transmission end 300, and an ECU2 410 and an HSM2 420, which are located at a receiving end 400. In particular, the ECU1 310 and the HSM1 320 may configure a portable diagnostic device.

The transmission end 300 may refer to a part or device which is connected to a CAN and configured to transmit a CAN message. The receiving end 400 may refer to a part or device which is connected to the CAN and configured to receive the CAN message. The ECU1 310 may be configured to transmit metadata (e.g., a random number and version information of firmware) to the HSM1 320 to request the HSM1 320 to generate a session key. The ECU1

310 may be configured to encrypt firmware using a session key delivered from the HSM1 320. In particular, the ECU1 310 may have a memory (not shown) configured to store a cryptographic algorithm such as the advanced encryption standard (AES) or the Rivest Shamir Adleman (RSA).

Herein, the memory may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

The ECU1 310 may be configured to transmit the metadata and the encrypted firmware to the receive end 400 via CAN communication. In particular, the ECU1 310 may be configured to broadcast the metadata and the encrypted firmware to the CAN. The HSM1 320 may be configured to generate a session key using a fixed key stored therein and the metadata delivered from the ECU1 310. In particular, the HSM1 320 may have a 'crypto' module used to generate the session key. Such a 'crypto' module may have a cryptographic algorithm such as the advanced encryption standard (AES) or the Rivest Shamir Adleman (RSA).

The ECU2 410 may be configured to receive the metadata and the encrypted firmware from the ECU1 310 via CAN communication. In addition, the ECU2 410 may be configured to deliver the metadata, received from the ECU1 310, to the HSM2 420. The version information of the firmware included in such metadata may allow the session key not to be used to decrypt firmware of another version. The ECU2 410 may be configured to decrypt the firmware using the session key delivered from the HSM2 420. The HSM2 420 may be configured to generate a session key using a fixed key stored therein, which is the same as the fixed key stored in the HSM1 320, and the metadata delivered from the ECU2 410. Particularly, the HSM2 420 may have a 'crypto' module used to generate the session key.

Figure 4:
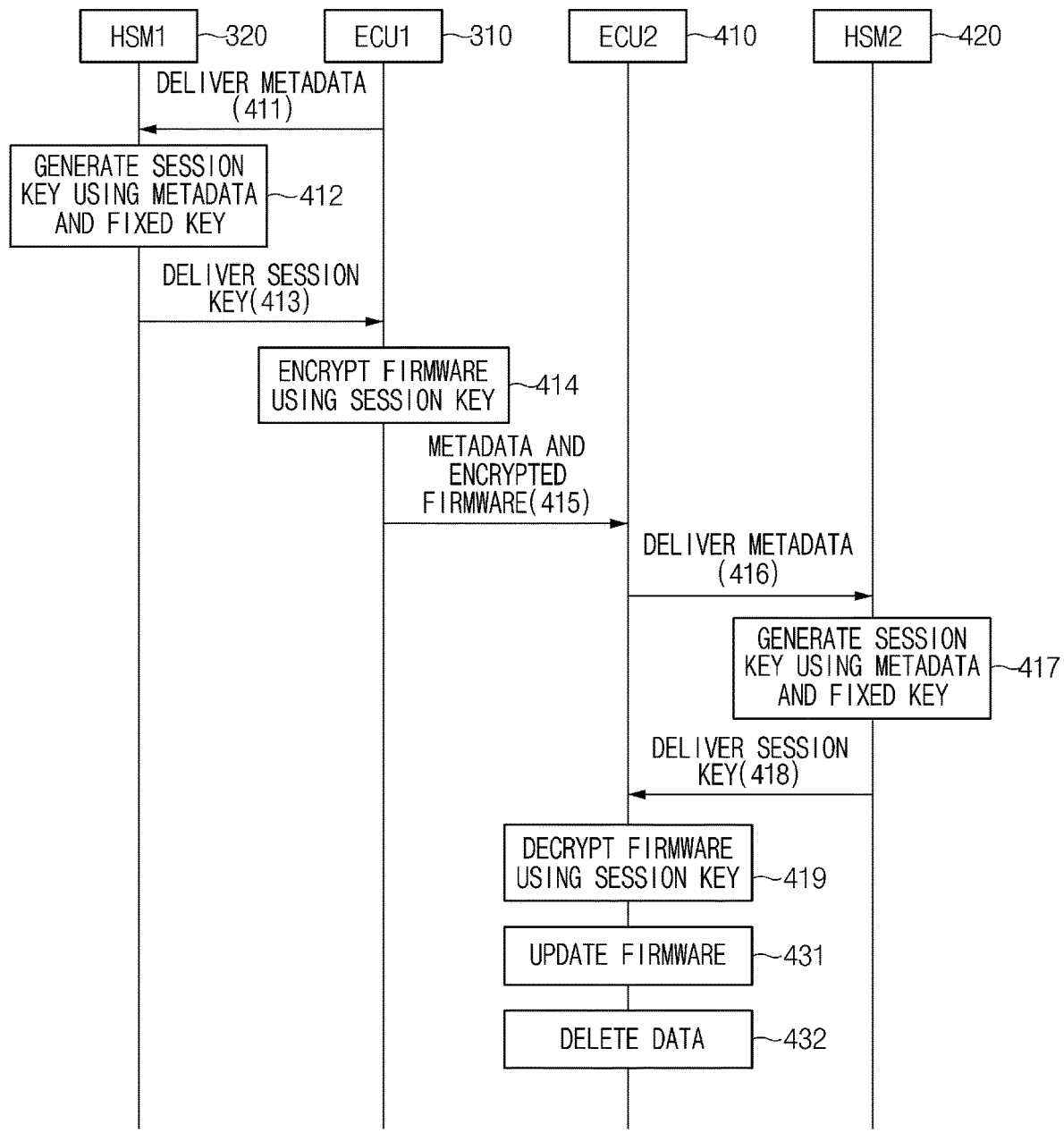
FIG. 4 is a signal sequence diagram illustrating a method for transmitting and receiving data based on a vehicle network according to another exemplary embodiment of the present disclosure.

FIG. 4 is a signal sequence diagram illustrating a method for transmitting and receiving data based on a vehicle network according to another exemplary embodiment of the present disclosure. Firmware will be described as being an example of data. First of all, in operation 411, an ECU1 310 which wants to update firmware of an ECU2 410 may be configured to generate metadata and deliver the generated metadata to an HSM1 320.

In operation 412, the HSM1 320 may be configured to generate a session key using a fixed key stored therein and the metadata delivered from the ECU1 310. In operation 413, the HSM1 320 may be configured to deliver the generated session key to the ECU1 310. In operation 414, the ECU1 310 may be configured to encrypt firmware using the session key delivered from the HSM1 320. In operation 415, the ECU1 310 may be configured to transmit the encrypted firmware to an ECU2 410 via a CAN. In particular, the ECU1 310 may be configured to broadcast the encrypted firmware to the CAN. In operation 416, the ECU2 410 may be configured to deliver metadata to the HSM2 420.

In operation 417, the HSM2 420 may be configured to generate a session key using a fixed key stored therein and the metadata delivered from the ECU2 410. In operation 418, the HSM2 420 may be configured to deliver the generated session key to the ECU2 410. In operation 419, the ECU2 410 may be configured to decrypt the firmware using the session key delivered from the HSM2 420. In particular, the ECU2 410 may be configured to record the decrypted firmware in a flash memory for each block. In operation 431, the ECU2 410 may be configured to update the firmware.

When the update of the firmware of the ECU2 410 is completed, in operation 432, the ECU2 410 may be configured to delete the data recorded in the flash memory. The method for transmitting and receiving data based on a vehicle network according to an exemplar)/embodiment of the present disclosure may allow the HSM1 320 and the HSM2 420 to generate the session key capable of being used in only the current session using the metadata and the unique key possessed therein, thus preventing the unique key from being directly transmitted to the ECU1 310 and the ECU2 410 to prevent the unique key from being leaked to the outside.

Furthermore, the method for transmitting and receiving the data based on the vehicle network according to an exemplary embodiment of the present disclosure may prevent the previously generated session key from being used to decrypt firmware of another version by using version information of firmware in the process of encrypting/decrypting the firmware. In addition, the method for transmitting and receiving the data based on the vehicle network according to an exemplary embodiment of the present disclosure may allow the ECU1 310 and the ECU2 410 to perform the process of encrypting/decrypting the firmware, thus minimizing the number of times of calling or accessing an HSM API to facilitate real-time transmission and reception of the firmware.

Figure 5:
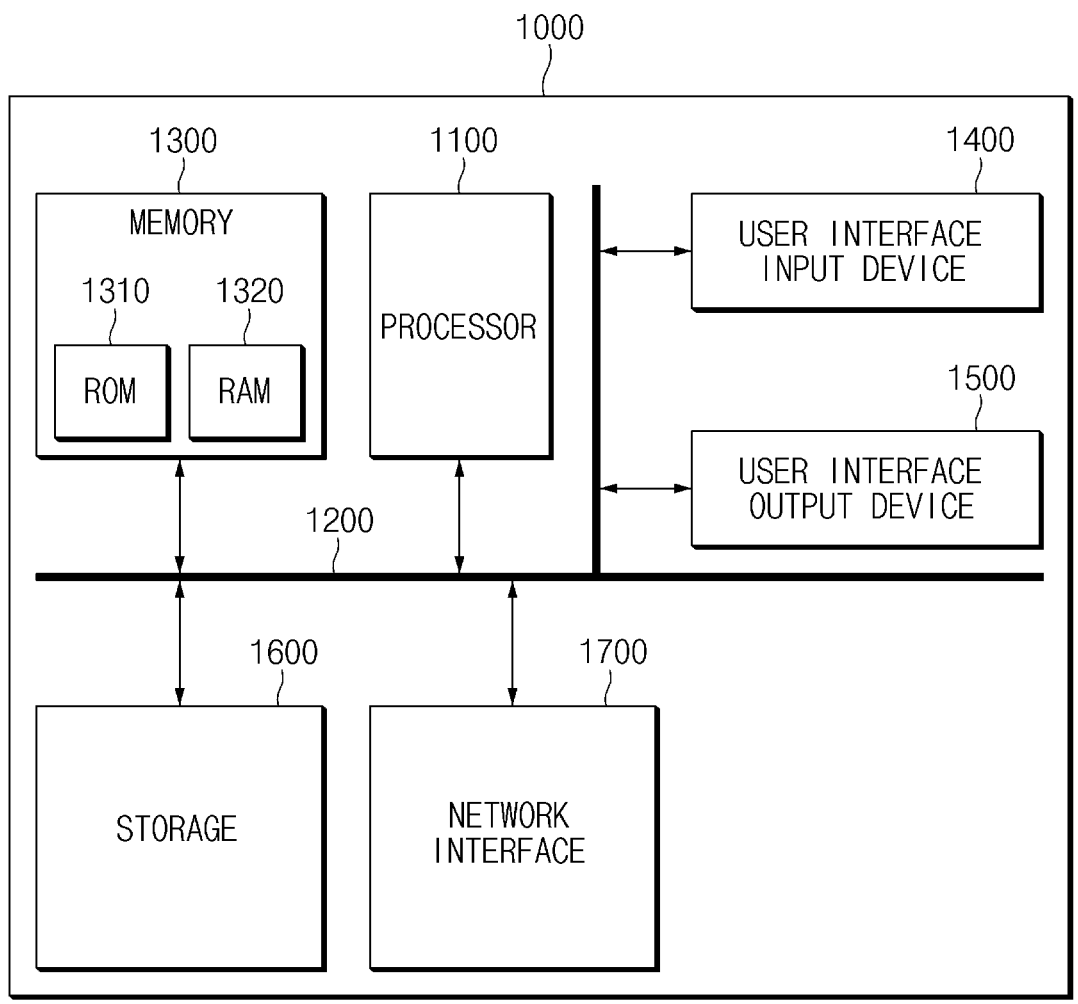
FIG. 5 is a block diagram illustrating a computing system for executing a method for transmitting and receiving data based on a vehicle network according to an exemplary embodiment of the present disclosure.

FIG. 5 is a block diagram illustrating a computing system for executing a method for transmitting and receiving data based on a vehicle network according to an exemplary embodiment of the present disclosure. Referring to FIG. 5, the above-mentioned method for transmitting and receiving the data based on the vehicle network according to an exemplary embodiment of the present disclosure may be implemented by the computing system. A computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (e.g., the memory 1300 and/or the storage 1600) such as a RAM, a flash memory, a ROM, an EPROM, an EEPROM, a register, a hard disk, a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The system for transmitting and receiving the data based on the vehicle network and the method therefor may allow the transmit end to encrypt data using the session key generated by the hardware security module 1 (HSM1) and transmit the encrypted data over the vehicle network and may allow the receive end to decrypt the data (the encrypted data) using the session key generated by the HSM2, thus safely transmitting and receiving data although the session key is leaked.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A method for transmitting and receiving data based on a vehicle network, comprising:
    generating, by a first hardware security module (HSM), a first session key using a first random number and a first fixed key;
    encrypting, by a first electric control unit (ECU), a message using the first session key;
    generating, by a second HSM, a second session key using a second random number and a second fixed key; and
    decrypting, by a second ECU, the message using the second session key.

2. The method of claim 1, wherein the generating of the first session key includes:
    generating, by the first ECU, the first random number; and
    delivering, by the first ECU, the first random number to the first HSM.

3. The method of claim 1, wherein the encrypting of the message includes:
    encrypting data recorded in a payload of the message.

4. The method of claim 1, wherein the encrypting of the message includes:
    transmitting the encrypted message over the vehicle network.

5. The method of claim 1, wherein the generating of the second session key includes:
    generating, by the second ECU, the second random number which is the same as the first random number;
    delivering, by the second ECU, the second random number to the second HSM; and
    generating, by the second HSM, the second session key using the second fixed key which is the same as the first fixed key and the second random number.

6. The method of claim 1, wherein the message is a controller area network (CAN) message.

7. A system for transmitting and receiving data based on a vehicle network, comprising:
    a first hardware security module (HSM) configured to generate a first session key using a first random number and a first fixed key;
    a first electric control unit (ECU) configured to encrypt a message using the first session key;
    a second HSM configured to generate a second session key using a second random number and a second fixed key; and
    a second ECU configured to decrypt the message using the second session key.

8. The system of claim 7, wherein the first ECU is configured to generate the first random number and deliver the generated first random number to the first HSM.

9. The system of claim 7, wherein the first ECU is configured to encrypt data recorded in a payload of the message and transmit the encrypted message over the vehicle network.

10. The system of claim 7, wherein the second ECU is configured to generate the second random which is the same as the first random number and deliver the generated second random number to the second HSM.

11. The system of claim 7, wherein the second HSM is configured to generate the second session key using the second fixed key which is the same as the first fixed key and the second random number.

* * * * *